United States Patent [19]

Watanabe et al.

[11] 4,449,804
[45] May 22, 1984

[54] INTERVAL TIMER DEVICE

[75] Inventors: Yoshitaka Watanabe, Tokyo; Jiro Kazumi, Kanagawa, both of Japan

[73] Assignee: Canon Kabushiki Kaisha, Tokyo, Japan

[21] Appl. No.: 381,561

[22] Filed: May 24, 1982

[30] Foreign Application Priority Data

May 23, 1981 [JP] Japan .................. 56-78398

[51] Int. Cl.³ ............ G03B 15/05; G03B 17/40
[52] U.S. Cl. ............................ 354/418; 354/266; 354/419
[58] Field of Search ............ 354/32-35, 354/60 F, 60 R, 126-129, 131, 145, 266, 48, 50, 51, 268, 140; 352/169

[56] References Cited

U.S. PATENT DOCUMENTS 3,961,342  6/1976  Masda ................. 354/60 R
4,086,582  4/1978  Kiyohara et al. ........ 354/145 X
4,096,500  6/1978  Lermann et al. ........ 354/173
4,161,355  7/1979  Sahara et al. ......... 354/60 R X
4,239,361 12/1980  Harvey ............... 354/219 X
4,364,647 12/1982  Kawamura et al. ...... 354/266 X Primary Examiner—William B. Perkey
Attorney, Agent, or Firm—Toren, McGeady and Stanger

[57] ABSTRACT

The present invention relates to an interval timer device for a camera, particularly an interval timer for producing a release signal for operating the shutter release operation of a camera at a certain predetermined frequency and a charge signal for performing the charge operation of the flash device a certain predetermined time before the release signal is produced. In the case of this kind of the interval timer device, because the flash device has been charged a certain predetermined time before the release signal is produced, the flash time can be emitted without fail at the time of photographing. However, because the above device is charged independently of the object brightness, even in case the object brightness is so high that the flash photography is not necessary, unnecessary power is often consumed. In accordance with the present invention, the interval timer device produces the above charge signal only in case of a low object brightness, so as to eliminate the above shortcomings.

5 Claims, 4 Drawing Figures

INTERVAL TIMER DEVICE

BACKGROUND OF THE INVENTION

1. Field of the Invention

The present invention relates to an interval photographing device for releasing the camera shutter at a certain predetermined time interval.

2. Description of the Prior Arts

Until now, the interval photographing device has been contributing much to the unattended photography for scientific studies, etc. which continue for several days in the place where no commercial current source is available. Where the interval photographing device is used, even if the object brightness is changed somewhat in the interval a proper exposure can be obtained with an automatic exposure mechanism built in the camera. However, when the object brightness is remarkably low, for example, in the night, outside the range of the automatic exposure of the camera, an electronic exposure device is required. Thus, when the interval photographing device is used together with the electronic flash device, it is an important consideration to save the power consumption so as to prolong the life of the battery.

Until now, as is disclosed in Japanese Patent Application Laid-Open No. Sho 53-116148, a preliminary signal is delivered to an electronic flash device before the start of the photographing so as to start the charge operation of the electronic flash device, whereby the power source switch of the electronic flash device is opened until a preliminary signal is delivered in order to avoid the power consumption. In this system, before photographing the preliminary signal is delivered to the electronic flash device so as to carry out the charge operation so that even when the object brightness is so high that the flash light is not necessary, the device emits the flash and, therefore, thus causing possibilities of an over exposure and a large power consumption. Therefore, the system is not suited for the object whose brightness changes.

Although quite recently, an electronic flash device which does not operate according to the object brightness has been proposed, the device is unavoidably charged, and a considerable power is consumed thereby so that the system is not suited for the interval photographing device with a battery.

In the case of the above interval photographing device, as the release signal is simply delivered at a certain predetermined interval and the shutter is released simply in accordance with the signal, it is necessary to always supply current to the light measuring circuit of the camera irrespectively of the release interval, so that even in the light measuring circuit the power is consumed in a disadvantageous way.

SUMMARY OF THE INVENTION

It is an object of the present invention to provide an interval photographing device by means of which the unnecessary power consumption can be avoided, while the proper exposure can always be guaranteed so as to resolve the above problems.

In order to achieve the above object, the interval photographing device in accordance with the present invention comprises a light measurement signal producing means for producing a light measurement signal before a certain predetermined time needed for charging the electronic flash device after the photographing signal is produced, a light measuring means for measuring the light with the input of the light measurement signal and a charge control means for starting the charge operation of the electronic flash device when the output level of the light measuring means is lower than the determined level.

It is another object of the present invention to provide an interval photographing device so designed that the light measuring circuit is operated with constant interval signals in such a manner that the current is supplied to the light measuring circuit immediately before the photographing is carried out at the above interval so that the unnecessary power consumption in the light measuring circuit is avoided.

Further other objects of the present invention will be clear from the description to be made below with reference to the accompanying drawings.

DETAILED DESCRIPTION OF THE PREFERRED EMBODIMENTS

Figure 1:
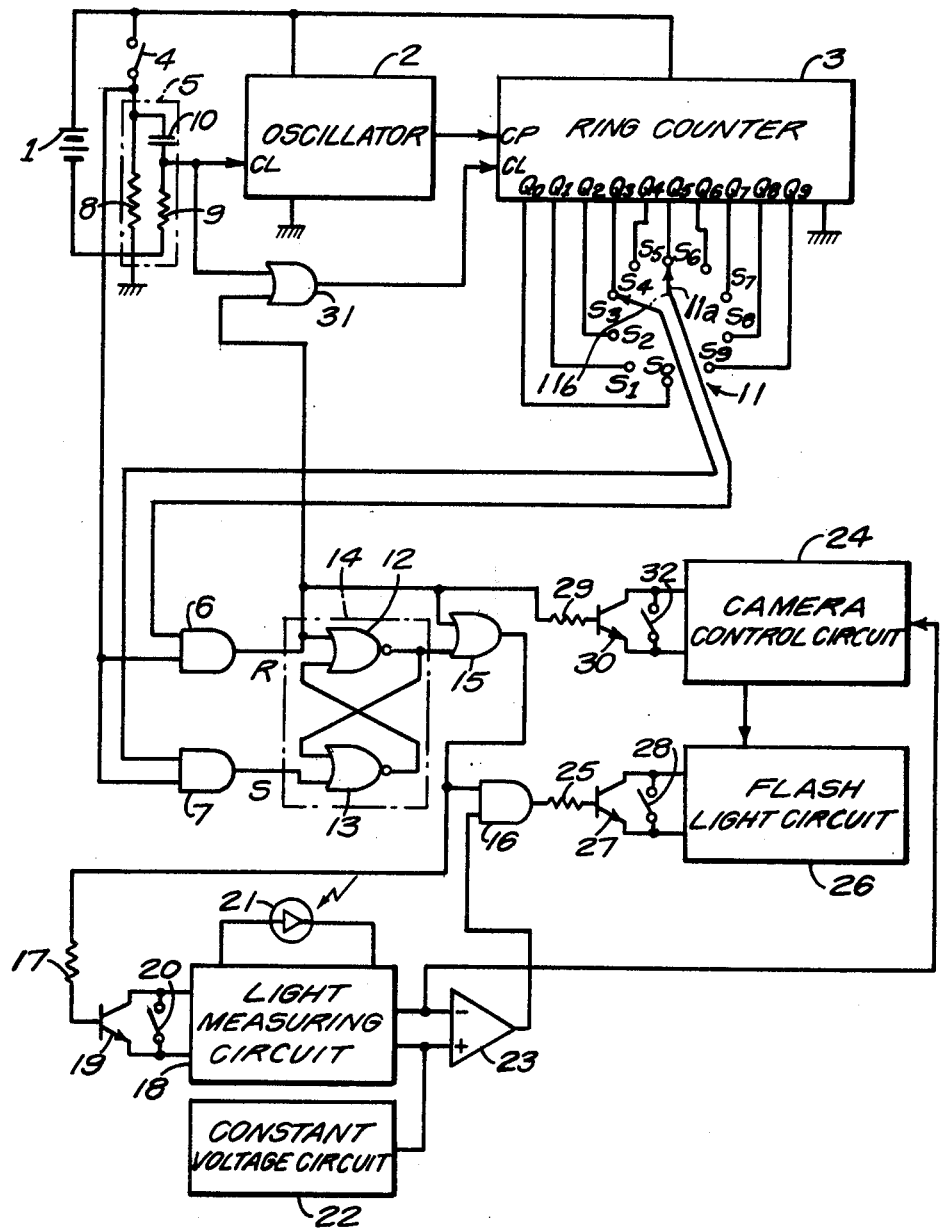
FIG. 1 shows the circuit diagram of an embodiment of the interval photographing device in accordance with the present invention.

FIG. 1 shows an embodiment of the present invention. The power source 1 serves to supply voltage to the oscillator 2 and the ring counter 3, and to the power up clear circuit 5 and the AND gates 6 and 7 with the closure of the starting switch 4. The power up clear circuit 5 consists of the resistances 8 and 9 and the capacitor 10, serving to supply a high level pulse to the clear terminal CL of the oscillator 2 and the clear terminal CL of the ring counter 3, so as to reset them. The contact S0–S9 of the rotary switch 11 are connected to the output terminals Q0–Q9 of the ring counter 3, while the two contacts are connected to the one input terminal of the AND gates 7 and 6. When the contact 11a is set the contact 11b is set at the same time, being advance by a certain determined number of contacts. In case of the present embodiment, the contact 11b is set at the contact S2, which is advanced by two contacts.

The flip flop circuit 14 consisting of the NOR gates 12 and 13 is set with the output of the AND gate 7 and reset with the output of the AND gate 6. The output of the flip flop circuit 14 is delivered to the OR gate 15 together with that of the AND gate 6, while the output of the OR gate 15 is delivered to the AND gate 16 and to the base of the transistor serving to supply the driving current to the light measuring circuit 18 via the resistor 17. 20 is the power source switch to be closed with the first step operation of the release member and 21 is the photo diode for detecting the brightness of the object. The output level of the light measuring circuit 18 is compared with the determined level of the constant voltage circuit 22 in the comparator 23, whose output is delivered to the other input termnal of the AND gate 16. The output of the light measuring circuit 18 is delivered to the camera control circuit 24, which controls the shutter time and the aperture in accordance with the level of the output.

The output of the AND gate 16 is delivered to the base of the transistor 27 for starting to charge the electronic flash circuit 26 via the resistor 25. The transistor 27 is connected parallel to the power source switch 28.

The output of the AND gate 6 is delivered to the base of the transistor 30 for driving the camera control circuit 24 via the resistor 29 and to the clear terminal CL of the ring counter 3 via the OR gate 31. The camera control circuit 24 includes the automatic exposure circuit, the electromagnetic release circuit and so on and serves to release the shutter when the release switch 32 to be closed with the second step operation of the release member is closed.

The light measuring circuit 18, the switch 20, the photo diode 21, the constant voltage circuit 22 and the control circuit 24 constitute the electrical circuit at the side of the camera. The electronic flash circuit 26 and the switch 28 constitute the flash device and other circuit members the interval timer circuit.

Figure 2:
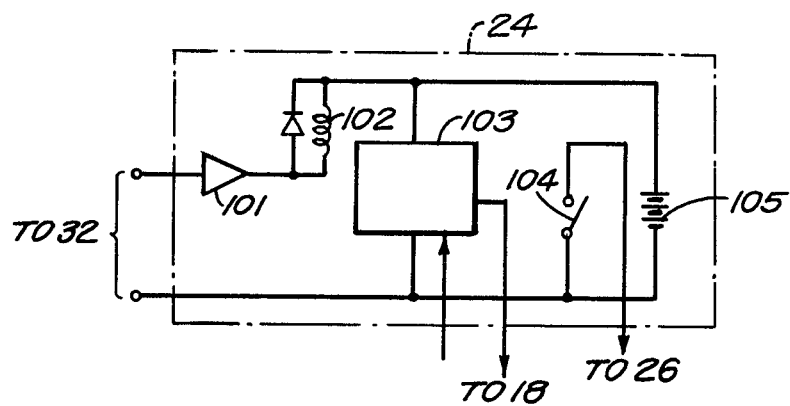
FIG. 2 shows the circuit diagram of an embodiment of the control circuit of the camera shown in FIG. 1.

FIG. 2 shows the circuit of an embodiment of the control circuit shown in FIG. 1. In the drawing, 105 is the power source, 101 is the buffer amplifier connected to the switch 32 and the transistor 30, 102 is the magnet for driving the release member of the camera, 104 is the synchronization switch operatively engaged with the shutter running, and 103 is the conventional exposure control circuit for controlling the shutter time and the aperture in accordance with the output of the light measuring circuit 18.

Figure 3:
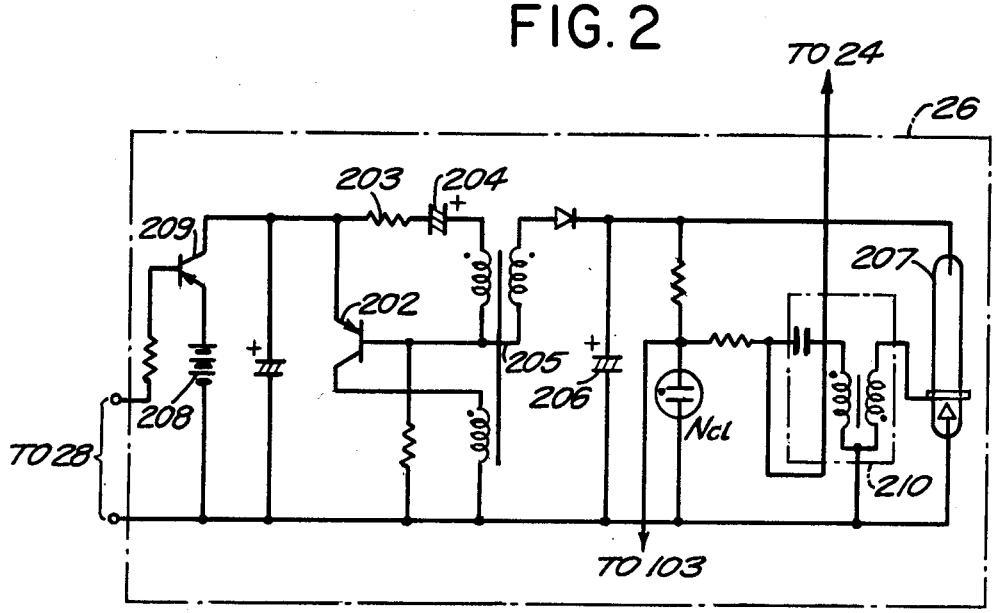
FIG. 3 shows the circuit diagram of an embodiment of the flash device shown in FIG. 1.

FIG. 3 shows the circuit of an embodiment of the electronic flash circuit shown in FIG. 1. In the drawing, 208 is the power source and 209 is the transistor, whose base is connected to the switch 28 or the transistor 27. 202 is the oscillation transistor, 203 is the resistor, 204 is the condenser and 205 is the transformer, whereby these circuit members constitute a voltage step up circuit. 206 is the main condenser, 207 is the flash tube and 210 is the trigger circuit to be operated with the closure of the synchronization switch 104.

Figure 4:
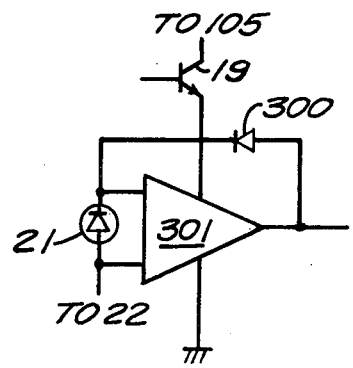
FIG. 4 shows the circuit diagram of an embodiment of the light measuring circuit 18 shown in FIG. 1.

FIG. 4 shows the circuit of an embodiment of the light measuring circuit shown in FIG. 1. In the drawing, 21 and 19 are the photo diode and the transistor shown in FIG. 1, 301 is the operational amplifier and 300 is the logarithmic compressing diode.

Below the operation will be explained. The photographing time interval is set at the position of the contact 11a of the rotary switch. Namely, when the terminal S5 is selected, the time since the ring counter 3 is reset till the level of the output terminal Q5 to which the contact 11a is connected becomes high is the photographing interval.

The difference between the position of the contact 11a of the rotary switch 11 and that of 11b is decided in accordance to the determined time needed for the charge operation of the electronic flash circuit 26.

When the start switch 4 is closed, the oscillator 2 and the ring counter 3 is reset with the output of the power up clear circuit 5 and at the same time, the AND gates 6 and 7 open. The clock produced in the oscillator 2 is delivered to the clock input terminal Cp of the ring counter 3 in such a manner that when the ring counter 3 has counted four clocks the output level at the output terminal Q3 becomes high and the output is delivered to the flip flop 14 via the contact S3 of the rotary switch 11 and the contact 11b and the AND gate 7 so as to set the flip flop circuit 14. When the flip flop circuit 14 is set the light measuring signal is produced, the transistor 19 is brought in the switched on state and the current is supplied to the light measuring circuit 18 so as to start the light measurement. When the output level of the light measuring circuit 18 is lower than the determined level of the constant voltage circuit 22, namely when the object brightness is lower than the determined brightness the output level of the comparator 23 becomes high and the output brings the transistor 27 in the switched on state via the AND gate 16 so as to start to charge the electronic flash circuit 26.

Namely, when the transistor 27 is brought in the switched on state, the transistor 209 in FIG. 3 is brought in the switched on state, whereby the voltage step up circuit operates so as to start to charge the main condenser 206.

After then the ring counter 3 continues counting until the sixth clock is counted, when the output level at the output terminal Q6 becomes high and the output is delivered to the base of the transistor 30 as the photographing signal via the contacts S5 and 11a of the rotary switch 11 and the AND gate 6. Thus, the transistor 30 is brought in the switched on state and the camera control circuit 24 operates to release the shutter. Namely, when the transistor 29 is brought in the switched on state, the magnet 102 in FIG. 2 is excited so as to drive the not shown shutter member and allow the leading shutter curtain to start to run. Thus, synchronization switch 104 is closed so as to operate the trigger circuit 210. As is explained above the flash device starts to be charged already before the ring counter 3 delivers an output from the output terminal Q5 and it has been charged when the output is delivered from the output terminal Q5. Namely, the flash tube 207 emits the flash with the trigger signal from the trigger circuit 210 so as to complete the flash light photography. Further at this time the exposure control circuit 103 controls the shutter time for example, at 1/60 sec. independently of the output of the light measuring circuit 18. Namely, because as explained above, the main condenser has been charged before the shutter release the neon tube is switched on before the shutter release, whereby the switch on signal of the neon tube is delivered to the exposure control circuit, whose shutter control mode is set for example, at 1/60 sec. in a conventional way so that the flash light photography is possible at the synchronization time.

Further, at the same time, when the shutter is released with the high level output of the AND gate 6 as explained above, the flip flop circuit 14 and the ring counter 3 are reset. Thus, the level of all of the outputs of the counter 3 becomes low, while the output level of the AND gate 6 also becomes low. When the level of the output of the AND gate 6 becomes low the transistor 19 is brought in the switched off state, whereby the current supply to the light measuring circuit 18 is interrupted and the circuit 18 stops light measurement. Further, the AND gate is also brought in the switched off state and the electronic flash device 26 stops the charging operation. As explained above, when the object brightness is low, the flash device is charged before the release signal is delivered from the counter and after the device has been charged the shutter is released in such a manner that the flash photography is carried out at the synchronization time, while at the same time, with the shutter release the current supply to the light measuring circuit is interrupted while the charging operation of the flash device is prohibited. After the flash photography is finished, the camera control circuit 24 winds the film with the conventional winding mechanism (not shown in the drawing).

Further, the counter 3 is reset at the same time with the shutter release as explained above and starts the counting again. Thus, the above operation is repeated in such a manner that the above flash photographing is carried out.

Below the case that the brightness is high will be explained.

In the same way as in case of the low brightness, when the counter 3 delivers a high level output from the output terminal Q3 the flip flop circuit 14 is set, the transistor 19 is brought in the switched on state and the current is supplied to the light measuring circuit.

However, because in this case the output level of the light measuring circuit 18 is higher than that of the constant voltage circuit 22 the comparator delivers a low level output. Thus, in this case the AND gate 16 does not deliver the high level output, while the transistor 27 remains in the switched off state. Thus, the flash device is not charged.

After then, when in the same way as in the above case the counter 3 delivers a high level output from the output terminal Q5 the transistor 29 is brought in the switched off state as mentioned above, the shutter is released, the shutter time is controlled with the exposure control circuit 103 and then the film is wound in such a manner that a series of photographing sequence is completed. After then, the above operation is repeated with a certain determined frequency.

Further, because in case of the high brightness the flash device is not charged it does not emit the flash even when the switch 104 is closed while the neon tube Ne remains in the switched off state so that the shutter time is controlled with the output of the light measuring circuit 18.

Further, in case the time interval is largely changed the frequency dividing ratio of the frequency divider (not shown in the drawing) built in the oscillator 2 or the ring counter 3 is changed. As is explained above in accordance with the present invention the light measuring signal is produced before a certain determined time needed since the production of the photographing signal till the electronic flash device has been charged and the electronic flash device is charged when the output level of the light measuring means is lower than the determined level so that the charging operation of the electronic flash device can be prevented in case the object brightness is higher than the determined value so as to avoid the power waste, while unnecessary flash is avoided and thus the over-exposure can be avoided. Namely, the present invention is particularly suited for the unattended photography of an object whose brightness change is heavy. Further, the power consumption is remarkably small so that the present invention is particularly advantageous for the cold place where the efficiency of the battery is lowered and it is necessary to protect the battery. Further, because the electronic flash device has been charged at the time of the photographing the photographing time interval can be kept constant, which is quite convenient for the interval photography of the scientific pictures which require accuracy in time.

Further, because the current supply to the light measuring circuit is started immediately before the shutter release at a certain determined frequency it is not necessary to continuously keep the light measuring circuit in the supplied state with current at the time of the interval photography so that the power consumption in the light measuring circuit can also be reduced.

What is claimed is:

1. A photographic system comprising:
   (A) an interval timer for producing a first signal with a certain interval and a second signal with a certain time delay after said first signal produced;
   (B) a camera for performing a photographic operation in response to said second signal, said camera having:
      (a) light measuring means for measuring an intensity of light from the object; and
      (b) detecting means for detecting an output of light measuring means for producing a signal when output of light measuring means presents that the intensity of light is darker than a certain determined level;
   (C) flash device having:
      (a) a main capacitor;
      (b) flash means connected to said main capacitor;
      (c) charging means for charging said main capacitor, said charging means becomes operative in response to said first signal, and said charging means performing the operation when the detecting means producing the signal;
      whereby the charging means performing the charging operation before the photographic operation when the intensity of light is darker than the predetermined level.

2. A photographic system comprising:
   (a) interval timer for producing a first signal with a certain interval and producing a second signal with a certain time delay after said first signal is produced;
   (b) flash device having a main capacitor, a flash means and a charging means for charging the main capacitor;
   (c) photographic operation control means for performing photographic operation in response to said second signal; and
   (d) detecting means for detecting an intensity level of object light and producing a signal when the intensity level is lower than the predetermined level, said charging means becomes operative and performing the operation in response to said first signal when the detecting means produces said signal.

3. In a photographic system including means for detecting when object light is low or high, said system also including a flash device used with an interval timer which produces a first signal with a certain interval and a second signal for performing shutter release operation of a camera with a certain time delay after said first signal is produced, said flash device comprising:
   (a) a main capacitor;
   (b) flash means connected to said main capacitor;
   (c) charging means for performing a charging operation of said main capacitor, said charging means becoming operative in response to the first signal when the intensity level of object light is low and prohibiting the operation when the intensity level of object light is high.

4. A camera used with a flash device having a main capacitor, flash means connected to said main capacitor and charging means for charging said main capacitor in response to a first signal produced with a certain interval from an interval timer, said camera comprising:
   (a) means for activating shutter release means in response to a second signal produced from the timer with a certain time delay after said first signal is produced; and (b) a signal forming circuit which produces a signal for rendering said charging means non-operative when an intensity of object light level is higher than a predetermined level.

5. In a photographic system including a camera, an interval timer comprising a timer circuit, said timer circuit producing a first signal for carrying out a shutter release operation of the camera at a certain predetermined interval and a second signal for carrying out a charging operation of a flash device a certain predetermined time before the first signal is produced, said system further including a control circuit for prohibiting the production of the second signal when the object brightness is higher than a certain predetermined level.

* * * * *